United States Patent [19]
Welsh

[11] Patent Number: 5,611,402
[45] Date of Patent: Mar. 18, 1997

[54] METHOD OF IN-SITU REMEDIATION OF VOLATILE CONTAMINANTS FROM SOILS AND/OR ROCK

[76] Inventor: Robert H. Welsh, 345 Wellington Way, Springboro, Ohio 45066

[21] Appl. No.: 324,673

[22] Filed: Oct. 18, 1994

[51] Int. Cl.$^6$ .................................................. E21B 43/00
[52] U.S. Cl. ........................... 166/369; 166/373; 405/128
[58] Field of Search ..................................... 405/128, 258; 166/369, 370, 278, 56, 227, 230, 233

[56]     References Cited

U.S. PATENT DOCUMENTS

| | | | |
|---|---|---|---|
| 2,035,313 | 3/1936 | Griffin | 166/230 |
| 2,877,852 | 3/1959 | Bashara | 166/230 |
| 4,584,102 | 4/1986 | Bogart et al. | 405/128 X |
| 4,660,639 | 4/1987 | Visser et al. | 166/370 X |
| 5,115,866 | 5/1992 | Corte et al. | 166/370 |
| 5,197,541 | 3/1993 | Hess et al. | 166/370 X |
| 5,261,765 | 11/1993 | Nelson | 405/128 |
| 5,340,236 | 8/1994 | Ikenberry | 405/128 |
| 5,398,757 | 3/1995 | Corte et al. | 166/278 |
| 5,404,954 | 4/1995 | Whitebay et al. | 166/230 X |

*Primary Examiner*—Frank Tsay
*Attorney, Agent, or Firm*—Thompson Hine & Flory LLP

[57]     ABSTRACT

A process for removing volatile contaminants from soils and/or rock in the undersaturated or vadose zone involves drilling one or more boreholes into undersaturated soils and/or rock to a level below the delineated contaminants or to the top of the water table. A close-end, conduit having drilled holed in the sidewall in a lower section and enclosed in a sleeve of filtration material is placed into the borehole. A porous fill material is in turn placed within the borehole around the conduit. The upper portion of the borehole around the upper impermeable section of the conduit is sealed from atmospheric air by using a plug an fill material of low permeability. Additionally, a plastic sheeting seal is placed to cover the entire ground surface to prevent atmospheric air from migrating into the lower permeable section. A vacuum source is used to create suction in the borehole and the surrounding area to excavate the contaminants.

6 Claims, 2 Drawing Sheets

METHOD OF IN-SITU REMEDIATION OF VOLATILE CONTAMINANTS FROM SOILS AND/OR ROCK

FIELD OF THE INVENTION

This invention relates to an improved method of removing volatile contaminants from soils and/or rock as a method of in-situ decontamination of said soils and/or rock.

BACKGROUND OF THE INVENTION

Many techniques have previously been employed or utilized to remove volatile contaminants from the ground. One of the oldest and most common of these techniques is excavation whereby the contaminated soil is removed and replaced with backfill of clean earth. Excavation is a simple technique; however, it is not feasible with large volumes of soil or when the contamination has migrated a great distance. Other features which prevent soil excavation include geologic formations, buildings, foundations, and residences. When excavation of soils is not possible, the soil must be remediated in-situ.

DESCRIPTION OF THE PRIOR ART

Several methods for in-situ remediation have been developed. Although some of these methods are generally effective, they are somewhat limiting.

For example, U.S. Reissue Pat. No. 33,102 to Malot et. al. has many disadvantages. '102 makes use of a conduit with a lower portion being perforated. It is often difficult to precisely identify the location of migrating contaminants and in turn decide how much perforated lower conduit to use.

A second disadvantage is the increased air resistance by using perforated lower conduit. Perforated conduit known as "well screen" contains multitudes of horizontally oriented, thin rectangularly shaped slots in the conduit. This material around each slot increases air resistance to vacuum applied to the conduit, thus reducing remediation efficiency. Also these thin slots are apt to become clogged by fine materials from the surrounding fill and soils.

Another disadvantage in using perforated conduit is that it is sometimes difficult to remove the entire slotted conduit subsequent to final cleanup because gravel fill material may extend into and catch in the slots.

Yet another disadvantage in the use of perforated conduit can result from a concentricity of the pipe. At greater depths it is sometimes difficult to maintain the perforated lower conduit in the center of the borehole. This can result in parts of the perforated conduit being in direct contact with the side of the borehole, which in turn deprives the conduit of having a porous fill material surround it completely. This increases the chance of the "well screen" or perforations becoming blocked on the side against the borehole, thus reducing the remediation efficiency.

U.S. Pat. No. 4,730,672 to Payne also has some disadvantages. Using an open-ended, solid conduit in the borehole prevents an even distribution of air flow and vacuum. A greater vacuum will exist in the lower portion of the borehole as opposed to the upper portion of the well.

Another disadvantage also results from using open-ended, solid conduit. This design prevents proper water sampling with no openings in the conduit sides and no bottom closure.

U.S. Pat. No. 5,160,217 to Metzer et. al. has several disadvantages. As with U.S. Pat. No. 4,730,672, an open-ended, solid sidewall conduit will provide a less even distribution of air flow and vacuum. In this case however, a greater vacuum will exist in the upper portion of the borehole rather than the lower portion. Optimally, a well should have an even distribution of air flow and vacuum throughout a permeable section.

Another disadvantage relates to water sampling. This open-ended solid sidewall conduit well design completely prevents any type of U.S. Environmental Protection Agency approved water sampling. It also prevents the installation of a water pump at a later date, since the well does not extend to the bottom of the borehole.

Still another disadvantage with using open-ended, solid conduit is that there is very poor filtration from solids, sands or grit getting inside the conduit and on into the vacuum system itself.

SUMMARY OF THE INVENTION

The present invention provides an innovative process for removing volatile contaminants from soils and/or rock in the unsaturated or vadose zone, as well as those soils and/or rock adjacent to the water table. This invention involves drilling one or more boreholes downward into unsaturated contaminated soils and/or rock and to a level below the delineated contaminants (i.e. top of the capillary fringe of the water table) or to the top of the water table when contaminants are located on the water table. A closed-end, solid sidewall, hollow conduit pipe containing drilled holes in the sidewall in a lower section and enclosed in a sleeve of woven or nonwoven filtration cloth material is placed into the borehole. A porous fill material, such a gravel, is in turn placed within the borehole around the conduit pipe.

The upper portion of the borehole around the upper impermeable section of conduit pipe is sealed from atmospheric air by means of a plug and fill material of low permeability. Additionally, a plastic sheeting seal is placed to cover the entire ground surface to prevent atmospheric air from beyond the borehole from entering the ground and migrating toward the lower permeable section of conduit pipe. The open end of the conduit pipe extending above the borehole is connected, via a trunk line, to a vacuum source (i.e. blower or pump) capable of creating suction in the well hole and surrounding area.

Accordingly, it is an object of this invention to provide quick and cost-effective installation of the remediation system. Another object is to provide an equal distribution of air flow and vacuum throughout the entire permeable section of the well.

Another object of this invention is to allow rapid modification to the conduit pipe on-site to concentrate a greater air flow and vacuum at a define zone or depth. By using solid, sidewall conduit containing drilled holes, more holes can be selectively drilled as needed at a specific depth. (e.g. at a sand layer or lens).

Still another object of this invention is the efficient filtration from solids hindrances.

Yet another object of the invention is to allow water sampling and/or interval pump installation at future dates.

DETAILED DESCRIPTION OF THE INVENTION

Figure 1:
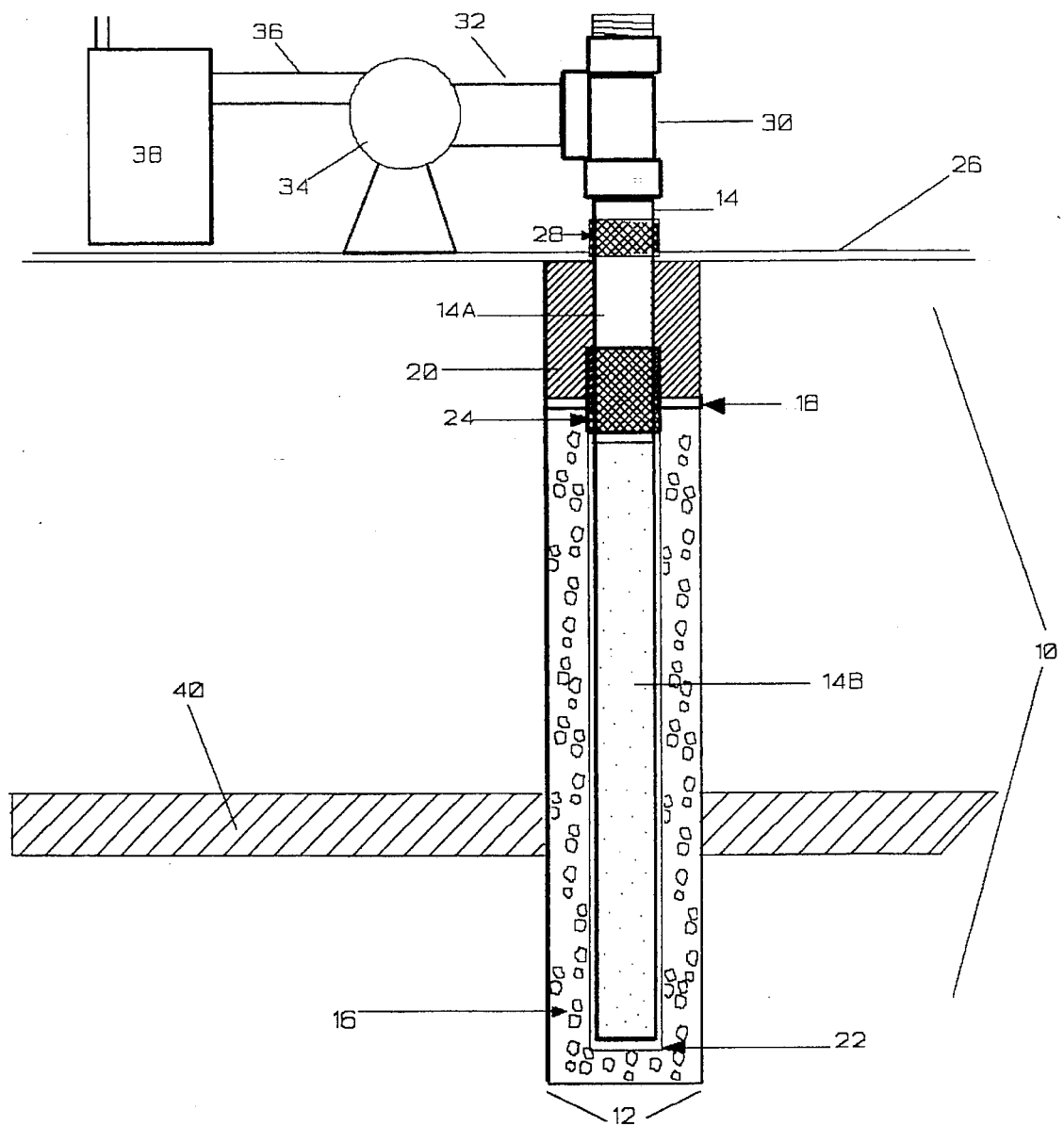
FIG. 1 shows a schematic, front elevational cross-section of a system in accordance with aspects of the invention.

This invention is used to remove volatile contaminants from soils and/or rock in the unsaturated or vadose zone including those soils and/or rock adjacent to the water table. The process utilizes basic principles of volatilization and vacuum extraction of contaminants well known in the art.

Once contamination of the subsurface by volatile liquid contaminant(s) has occurred, it is necessary to delineate the migration of the contaminant(s) both laterally and vertically. Delineation of this migration is achieved through common methods which are well known in the art. For example, test borings are usually made around the site at selected locations and sampled at various depths for chemical analysis. After the area of contamination has been delineated, it is necessary to design a remediation system which includes the locations and number of vacuum extraction wells needed to adequately remove the contaminant(s). This procedure is also well known in the art and will not be discussed here.

Once system design has been completed, one or more vacuum extraction wells will be installed into the contaminated unsaturated zone or down to and/or into the top of the water table, if contaminants have migrated this far.

The specific process herein described may be best understood from the following description which refers to the specific embodiments as illustrated in the drawings.

FIG. 1 shows a system used in accordance with embodiments of the invention. Referring to FIG. 1, the number 10 designates an unsaturated zone of soil and/or rock. Volatile contaminants in vapor and/or liquid phase are present in the unsaturated zone. A borehole 12 is drilled down into the unsaturated zone in the vicinity of the contaminants. A conduit 14 is placed into borehole 12. Conduit 14 consists of an upper solid section 14A and a lower perforate section 14B with a threaded end cap. The lower perforate section 14B is perforated by drilling holes into a solid sidewall hollow conduit pipe. These drilled holes will provide an equal distribution of air flow and vacuum throughout the entire perforate section 14B of the vacuum extraction well. This design utilizing drilled holes, rather than the standard slotted "well screen", allows for rapid modification to conduit 14B in the field to concentrate a greater air flow and vacuum at a defined zone or depth as needed. For example, if a sand lens 40 that was previously undetected or that is thicker than expected is encountered, more holes can be drilled to increase the air flow and vacuum to that zone. Before being placed into the wellbore, the lower perforate section 14B of conduit 14 is enclosed within a sleeve or sock 22 of woven or unwoven filtration cloth material. This filtration cloth provides an efficient filtration from solids hindrances. Sock 22 is held in place by a hose clamp 24. A porous fill material 16, such as pea gravel, is placed around the lower perforate section 14B to a point just above the drilled holes. Next, a seal material plug 18, such as bentonite, is set in the borehole at a level below hose clamp 24 yet well above the highest elevation of drilled holes in lower perforate section 14B. After plug 18 has set, a nonporous air impermeable mixture 20 is poured into the wellbore to a depth of one foot below ground surface. The wellbore is usually completed or covered with concrete.

The upper end of conduit 14 extends above ground and connects to pump or blower 34 via trunk line 32 which in turn connects to an emission treatment unit 38 via exhaust effluent line 36. Connecting the upper end of conduit 14 to trunk line 32 is a conduit tee 30 with screw cap. This tee and cap allow for sampling, well access, and pump installation at a later date, if needed.

After each vacuum extraction well conduit 14 has been connected to a vacuum source, a plastic sheeting seal 26 is placed on the ground surface to prevent atmospheric air from beyond the borehole from entering the ground and migrating toward the lower perforated section 14B of conduit 14. This sheeting is held in place around conduit 14 by hoseclamp 28.

Figure 2:
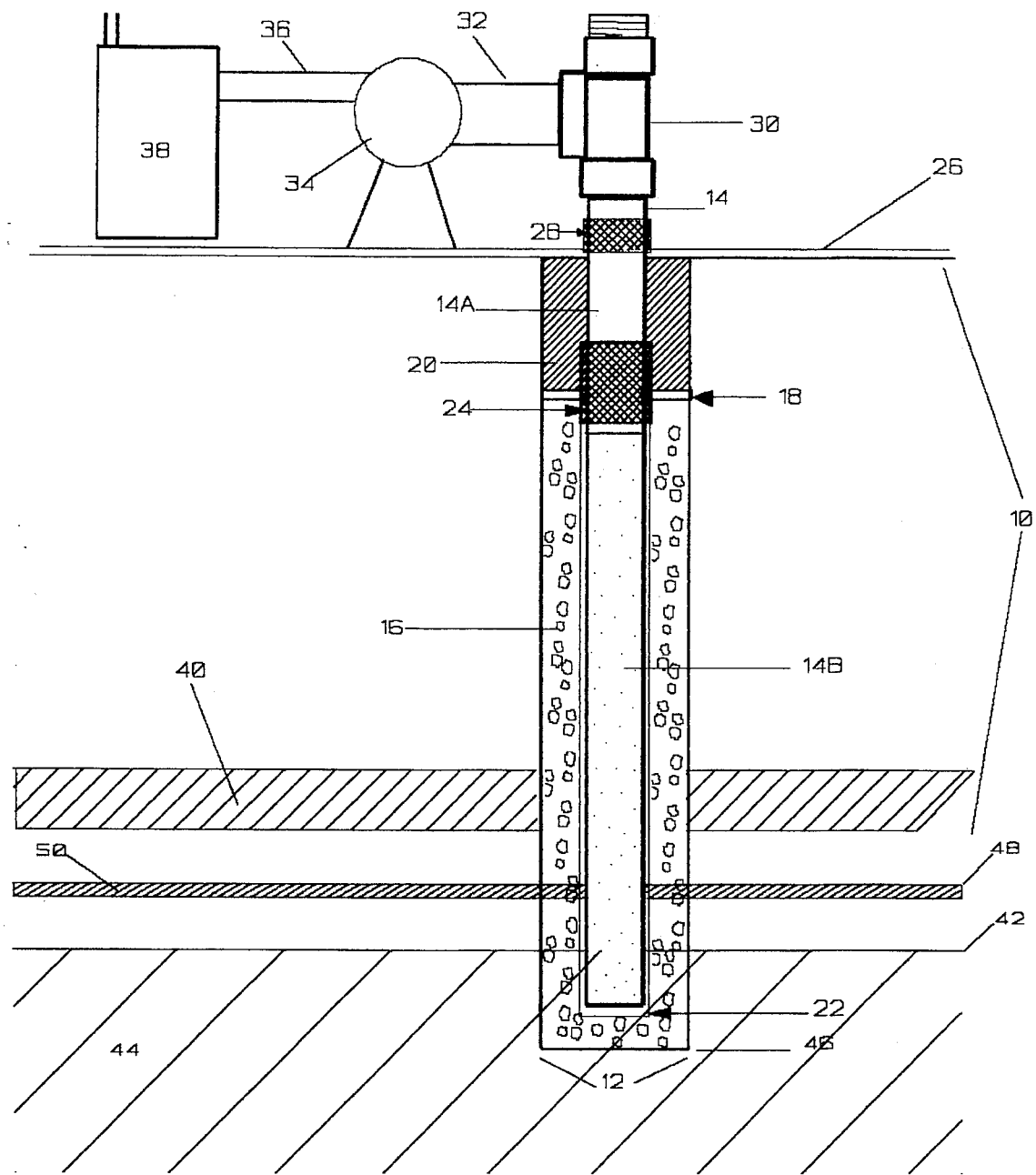
FIG. 2 shows a schematic, front elevational cross-section of a system in accordance with the invention wherein the borehole and conduit extends into the water table.

FIG. 2 shows a system in accordance with the invention which is similar to that shown in FIG. 1; however, the bottom 46 of borehole 12 extends through the top 48 of and below capillary fringe 42 through contaminant layer 50 and into water table 44. Vacuum well construction and completion is the same as shown in FIG. 1, the exception being that the lower perforate section 14B of conduit 14 extends in depth accordingly.

Once all vacuum extraction wells have been installed and connected to the vacuum source 34 via trunk lines 32, operation of the system may proceed. Referring to FIG. 1 or FIG. 2, the vacuum extraction wells are connected to a vacuum source 34 which in turn connects to an emission treatment unit 38 via exhaust effluent line 36. When it is not feasible to discharge the volatilized contaminant gas directly into ambient air, it must be treated (via unit 38). When the vacuum source 34 is turned on, the pressure in the lower perforate section 14B of borehole 12 is lowered, thereby inducing contaminant vapor, liquid, and air into the lower perforate section 14B. The vacuum then draws the air, liquid, and vapor to the surface through conduit 14. Liquids may be collected in a dropout container before reaching the vacuum source 34. These liquids can in turn be drained to a separate vessel for treatment and disposal. The contaminant vapor and air may be treated by means of adsorption, such as by activated carbon or catalytic oxidation, both well known in the art.

Vacuum source or pump 34 may be of any type known to those in the art. A variety of porous fill materials 16 may be used in accordance with the invention as long as they are capable of permitting air and vapors to flow to lower perforate section 14B. Pea gravel is the preferred material 16 in the invention. Likewise, bentonite is the preferred seal plug 18 material. Many nonporous, air impermeable mixtures 20 may be used as long as they are impermeable to the passage of air. Examples of 20 are bentonite, clayey soil, grouts, and cements.

Conduit 14 may be any material that is chemically resistant and air impermeable. PVC pipe has proven to be very effective.

This method of in-situ soil remediation may be used in a variety of soil and/or rock conditions. It may also be used inside buildings and under floors.

I claim:

1. A process for removing volatile contaminants from soils and/or rock in an unsaturated or vadose zone, including those soils and/or rock adjacent a water table comprising the steps of:

delineating an area of contamination;

providing a solid sidewall conduit, the conduit having a closed end; establishing a borehole into the vadose zone and into at least a top of a capillary fringe of the water table;

providing holes in the conduit to create an unperforated section and a perforated section which, when the conduit is placed into the borehole, the perforated section has a position corresponding to the area of contamination; placing the conduit within the borehole such that an annular zone is formed between the borehole wall and the conduit, the perforated section covered with a sleeve in a zone to allow fluids and/or vapors to flow from adjacent soil into the perforated section of the conduit while filtering solids from entering the perforated section of the conduit, the conduit having its upper end connected to a vacuum source;

filling the borehole to a point above an upper end of the perforated section of the conduit with a porous fill material;

placing a seal material plug into the borehole;

pouring a nonporous, air-impermeable mixture into the borehole on top of the seal material plug to seal the borehole from atmospheric air;

placing a plastic sheeting seal on the ground surface to prevent atmospheric air from beyond the borehole from entering the ground and migrating toward the perforated section of the conduit;

applying a vacuum to an upper end of the unperforated section of the conduit sufficient to induce contaminant air, vapors and liquids to flow from the vadose zone into the perforated section of the conduit; and removing contaminant air, vapors, and liquids.

2. The process as claimed in claim 1 wherein the sleeve is a woven or nonwoven filtration cloth material.

3. The process as claimed in claim 2 wherein the upper end of the conduit is connected to a vacuum source via a "Tee" fitting with removable screw cap.

4. The process as claimed in claim 1 wherein the porous fill material is pea gravel or sand and the seal material is bentonite or clay.

5. The process as claimed in claim 1 wherein the borehole extends into a groundwater capillary fringe or into a groundwater table.

6. The process as claimed in claim 5 wherein the conduit also extends into the groundwater capillary fringe or into the groundwater table.

* * * * *